US007865886B2

(12) United States Patent
Plum

(10) Patent No.: US 7,865,886 B2
(45) Date of Patent: Jan. 4, 2011

(54) BLOCKING OF NESTED LOOPS HAVING FEEDBACK OR FEEDFORWARD INDEXES

(75) Inventor: Hans-Joachim Plum, Zuelpich (DE)

(73) Assignee: Intel Corporation, Santa Clara, CA (US)

( * ) Notice: Subject to any disclaimer, the term of this patent is extended or adjusted under 35 U.S.C. 154(b) by 1436 days.

(21) Appl. No.: 11/289,177

(22) Filed: Nov. 28, 2005

(65) Prior Publication Data

US 2007/0169056 A1    Jul. 19, 2007

(51) Int. Cl.
*G06F 9/44* (2006.01)
(52) U.S. Cl. .................. 717/160; 717/151; 717/159
(58) Field of Classification Search .................. None
See application file for complete search history.

(56) References Cited

PUBLICATIONS

Li et al, "New tiling techniques to improve cache temporal locality", May 1999, vol. 34, pp. 215-228.*
Li et al, "Optimal skewed tiling for cache locality enhancement". 2003, 17th international Parallel and Distributed Processing Symposium.*
Dulong et al—Technology Journal Q4 1999—An Overview of the Intel IA-64 Compiler—pp. 1-15.
www.publib.boulder.ibm.com/infocenter/pseries/topic/com.ibm.vacpp7a.doc/compiler/ref/r...—Compiler Reference—#pragma block_loop—2 pages.

http://en.wikipedia.org/wiki/Loop_nest_optimization—Loop Nest Optimization—Wikipedia, the free encyclopedia—5 pages.
http://docs.hp.com/cgi-bin/pf-new.cgi?IN=/en/B3909-90003/ch05s05.html&printable=1—Loop Blocking—6 pages.
Intel Reference Manual—IA-32 Intel Architecture Optimization—Chapter 3 pp. 3-1 through 3-38 and Chapter 7 pp. 7-1 through 7-34.

* cited by examiner

Primary Examiner—Lewis A Bullock, Jr.
Assistant Examiner—Mark A Gooray
(74) Attorney, Agent, or Firm—Blakely, Sokoloff, Taylor & Zafman LLP

(57) ABSTRACT

A method and apparatus for to blocking nested loops having feedback or feedforward indexing. An embodiment of a method includes receiving a computer code segment, the segment including a first inner loop and a second outer loop, the inner loop being within the outer loop and the inn loops having a one-dimensional iteration space that is independent of the outer loop. The first loop is indexed by a variable I over a contiguous one-dimensional iteration space and addresses one or more data arrays with a shift in the index. The method further includes dividing a two-dimensional iteration space of the first loop and the second loop into multiple contiguous windows, where the second loop uses only one window of the plurality of windows during each iteration and the plurality of windows cover the iteration space. The method includes modifying the computer code segment by adding a third outer loop outside the second loop of the segment, the third loop encompassing the first loop and the second loop.

13 Claims, 7 Drawing Sheets

```
FOR OUTER_ITER = 1,N_ITER
    FOR I=1,N:  A(I) = F(B(I))   ! N is huge
    FOR I=1,N:  B(I) = G(A(I))
END FOR ! ITERATION
```

```
FOR ALL WINDOWS WIN
    FOR OUTER ITER = 1,N_ITER
        FOR I in WIN:  A(I) = F(B(I))  ! WIN is small enough to fit
                                         A and B into cache
        FOR I in WIN:  B(I) = G(A(I))
    END FOR  ! ITERATION
END FOR  ! WINDOWS
```

305

```
FOR  OUTER_ITER = 1,N_ITER
   FOR I=1,N:   A(I)   = F(B(I+1))
   FOR I=1,N:   B(I)   = G(A(I))
END FOR  ! ITERATION
```
Loop type 1: read forward

310

```
FOR  OUTER_ITER = 1,N_ITER
   FOR I=1,N:   A(I+1) = F(B(I))
   FOR I=1,N:   B(I)   = G(A(I))
END FOR  ! ITERATION
```
Loop type 2: write forward

315

```
FOR  OUTER_ITER = 1,N_ITER
   FOR I=1,N:   A(I)   = F(B(I-1))
   FOR I=1,N:   B(I)   = G(A(I))
END FOR  ! ITERATION
```
Loop type 3: read backward

320

```
FOR  OUTER_ITER = 1,N_ITER
   FOR I=1,N:   A(I-1) = F(B(I))
   FOR I=1,N:   B(I)   = G(A(I))
END FOR  ! ITERATION
```
Loop type 4: write backward

BLOCKING OF NESTED LOOPS HAVING FEEDBACK OR FEEDFORWARD INDEXES

FIELD

An embodiment of the invention relates to optimization of computer applications in general, and more specifically to blocking nested loops having feedforward or feedback indexes.

BACKGROUND

In the compilation of computer programs, the compiler attempts to generate instructions that most efficiently carry out the instructions of the original source code. The efficiency of the execution of code is dependent at least in part on how effective the hardware can execute the machine instructions. One of the biggest bottlenecks to efficient performance is main memory accesses because the right data is not in cache memory at the right time. Processes will inevitably bog down if the process is waiting for data from main memory. Placing data into cache will improve performance, but only if the cache can hold the data that is needed and the proper data is there at the proper time.

Among the strategies for compiling computer programs to improve performance are blocking strategies for loop based code sections. Program loops can involve a great number of memory accesses and thus involve a great deal of overhead. In particular, if a nested loop requests data from a large array, it may not be possible to fit all of the data elements into the cache or provide for the right logistics to achieve this, thereby slowing processing. Blocking generally involves dividing a loop's iteration into parts or blocks, with an additional outer loop, or blocking loop, generated to drive the original loop for each part. The use of blocking allows an array of data to be divided into blocks or windows of data for processing, thereby reducing the amount of data required for each iteration within a block. In such a situation, if data are used more than once and if a block of data fits within the cache, then cache exploitation is likely to be improved.

However, conventional blocking loop strategies are limited in scope. If a nested loop varies from normal indexing schemes, then conventional blocking strategies will not work because they cannot maintain semantical correctness and thus would produce false numerical answers. As a result, conventional techniques are not applicable to improve the performance of nested loops.

BRIEF DESCRIPTION OF THE DRAWINGS

Embodiments of the invention may be best understood by referring to the following description and accompanying drawings that are used to illustrate embodiments of the invention. In the drawings:

FIG. 3 is an illustration of certain loop types that may be addressed by embodiment of the invention;

FIG. 5A is an illustration of a window for a first loop type in an embodiment of the invention;

FIG. 5B is an illustration of a window for a second loop type in an embodiment of the invention;

FIG. 5C is an illustration of a window for a third loop type in an embodiment of the invention;

FIG. 5D is an illustration of a window for a fourth loop type in an embodiment of the invention;

DETAILED DESCRIPTION

Figures 1A, 1B:
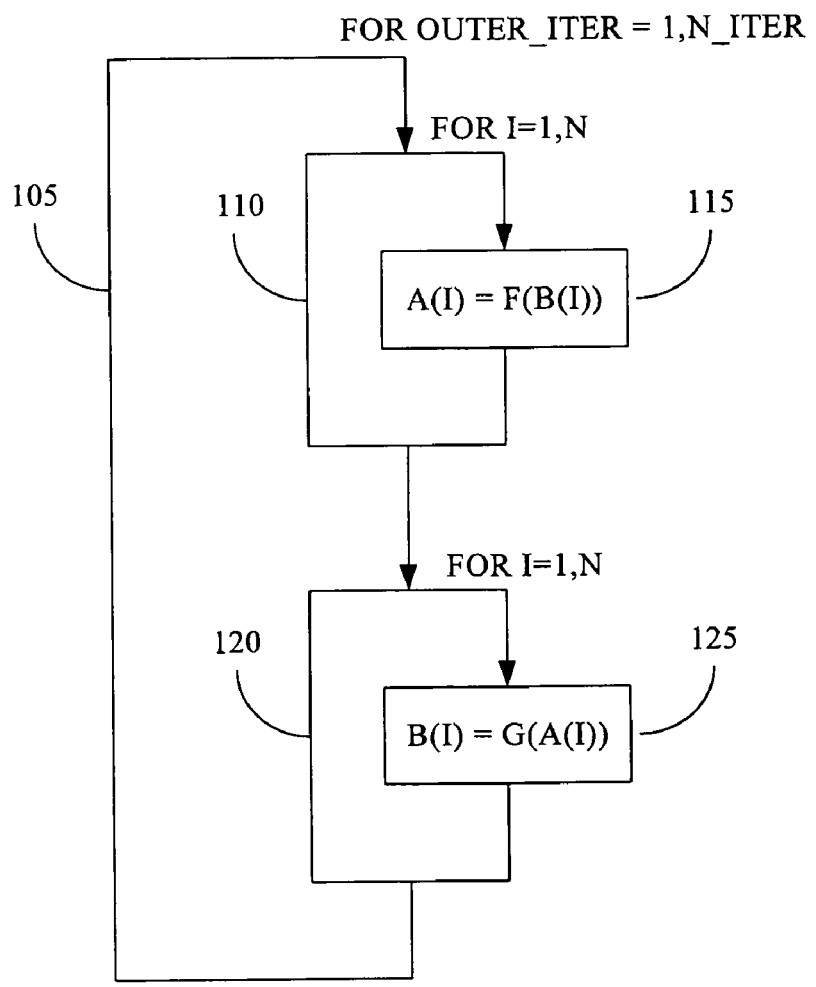
FIG. 1A is an illustration of code for a nested loop.
FIG. 1B is an illustration of the structure of a nested loop.

A method and apparatus are described for blocking nested loops having feedback or feedforward indexes.

In one embodiment of the invention, a system provides for blocking double nested loops for optimization when an outer loop iterates an inner loop that is allowed to have complicating properties such as feedforward or feedback indexes In an embodiment, the iteration space for the nested loops is divided by contiguous subsets (which are herein referred to as windows or blocks), where the outer loop iterates only one window at a time, and where an additional outer loop outside of the original outer loop provides for iteration over all windows.

In an example, a nested loop consists of an outer loop and an inner loop, the inner loop contained within the outer, with the index space of the inner loop being independent of the outer iteration. The inner loop updates any number of data arrays, including data arrays that are addressed by any constant shift of their indexes. In this example, a positive shift introduces a feedforward and a negative shift introduces a feedback. For example, FIG. 3 described below shows prototype examples of such loops.

In an embodiment of the invention, a code transformation provides for a blocking of nested loops that include feedforward or feedback indexing. The transformation could be done automatically by a compiler implemented through use of a code transformation tool, or may be done explicitly by a programmer. In such embodiment, the inner loop is divided into windows. The outer loop first iterates the first window only, including feedbacks and feedforwards that can make a shifting or reduction of the window necessary. An additional outer loop outside the original outer loop, added automatically, by a tool, by a programmer, or otherwise implemented into the code, provides for an iteration over the multiple windows.

In the architecture of a microprocessor, memory access is often the major bottleneck to performance. Because of the time consumed in obtaining data from memory, it is common to include cache memory, which is generally a smaller memory that includes copies of data that may be more quickly accessed. However, a cache memory is only useful if enough of the data being accessed is contained within the cache. An issue regarding the compilation of loops in computer applications is whether the amount of data that is to be accessed in a loop is sufficiently large that it isn't possible to store all of the data within the cache. If this is true, it generally will be necessary to pull data from slower memory, thereby greatly slowing the performance of the computer application, if the loop structures are not modified in compilation of the computer application.

For the purposes of this application, an "iteration space" is a contiguous set of integer number indexes needed for the iteration of one or more loops. An iteration space may have one or more dimensions. Associated with the iteration space are one or more data arrays addressed by the indexes. If the volume of these data is very large, the cache associated with the CPU (central processing unit) that is performing the processing cannot hold all of the data, and thus some data will be pushed out of the cache or will not reach the cache at all. For this reason, the iteration space may be divided into blocks. For example, an inner loop requiring data elements 1 through N (where N is large number), is repeated within an outer loop. In this example, the amount of data for the inner loop may be too great to be held in cache, and thus the outer loop may be unable to reuse cache data. For this reason, an iteration space may be divided into windows of data. The outer loop is then limited to a particular window of data so that all data used by the inner loop fits within the cache and can be reused multiple times by the outer loop. An additional outer loop outside the original outer loop runs over the sequence of windows, thus covering the whole iteration space.

The inner loop constitutes a one-dimensional iteration space, and the outer and the inner loops constitute a two-dimensional iteration space. Patching the innermost loop into windows means to divide the two-dimensional iteration space for the inner and outer loops into two-dimensional shapes. Conventional blocking strategies are limited to cases with no feedbacks or feedforwards, where these shapes take the simplest form of rectangles. These strategies are not applicable with feedbacks or feedforwards present. Under an embodiment of the invention, a strategy for blocking loops extends the general concept of blocking beyond a rectangle in iteration space. In an embodiment, blocking is provided that represents an arbitrary, or "jagged", shape in a multidimensional iteration space, and through this space covers loops with feedback or feedforward indexes. In this process, the blocks are skewed in the iteration space, i.e., when the indexing of arrays is not straight but includes forward or backward index shifts.

In an embodiment of the invention, a transformation implements a non-rectangular strategy for blocking loops, where a compiler may implement the strategy automatically. In this embodiment, blocking is generalized to provide for loops that include feedback or feedforward indexes. In an embodiment of the invention, a blocked loop implementation may lead to an arbitrary staircase shape within the two-dimensional iteration space for the loops.

In an embodiment of the invention, the use of skewed iteration space blocks honors the fact that data may only be utilized in an outer iteration when it is in the correct state, that is, when the data has received the needed updates. Subdividing the two-dimensional iteration space for loops may significantly change the order of data operations, modifying which data are updated by which iteration. In a blocked loop, this means that an outer loop can be performed only for a particular window when all previous outer loops have updated the window and all data it uses through read or write accesses. Furthermore, the window is required to leave all data in the correct state for all future windows.

FIG. 1A is an illustration of code for a nested loop. In this example, a loop provides two arrays that are updated through an innermost loop with an extremely large iteration space. FIG. 1B is an illustration of the structure of the nested loop shown in FIG. 1A. As shown in FIG. 11B, there is an outer loop 105 that will repeat for a certain number of iterations, shown here as index OUTER_ITER counting from 1 through N_ITER, which may be any number. Within this outer loop are two inner loops. A first inner loop 110 is repeated for index I from 1 through N, and includes a first operation 115 that provides A(I)=F(B(I)). A second inner loop 120 is repeated for index I from 1 through N, and includes a second operation 125 that provides B(I)=G(A(I)). This is a simplified illustration, and there may be one or more other operations included in such a nested loop structure. In this illustration, the index I for the inner loop is used straight, that is, without any feedforward or feedback indexing. As is clear from the illustration, during each iteration of the outer loop 105 the first inner loop 10 will repeat the first operation 115 N times, which is followed by the second inner loop 120 repeating the second operation 125 N times. If N is relatively small, then it may be possible to load all current values of the arrays into cache memory and provide for a re-use of the data through all iterations of the outer loop 105. However, if N is sufficiently large, then the cache will not hold all of the values and it will be necessary to load values from slower memory, thereby reducing system performance. In this example, the indexing of the inner loops does not show any feedback or feedforward indexes, which would add additional complications. In an embodiment of the invention, a process for addressing nested loops is expanded to include feedback and feedforward indexes in the inner loop.

Figures 2A, 2B:
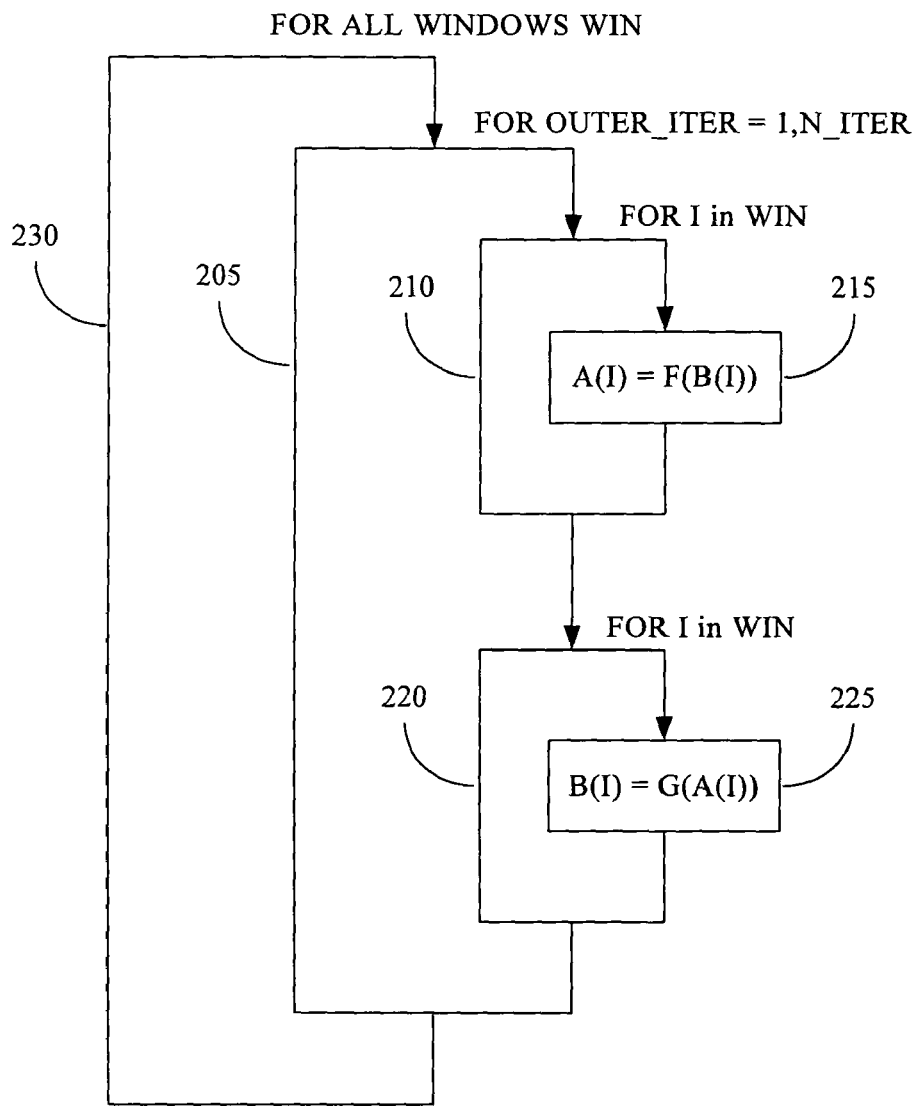
FIG. 2A is an illustration of blocking for a nested loop.
FIG. 2B is an illustration of the structure of a nested loop after blocking is implemented.

FIG. 2A is an illustration of blocking for a nested loop, such as shown in FIGS. 1A and 1B. In this illustration, the nested loop provided in FIG. 1A has been blocked by the addition of an additional loop that limits iterations to values within a window in the iteration space for the nested loop. As shown in FIG. 2A, an additional outermost loop has been added for a number of windows of values in the iteration space. FIG. 2B is an illustration of the structure of a nested loop after blocking is implemented. As shown in the figure, an outer loop 205 is in place, and provides iterations for OUTER_ITER from 1 to N_ITER. The first inner loop 210 with first operation 215 and the second inner loop 220 with second operation 225 are now limited to values of I within the current window WIN. To implement this, there is now an added outermost loop 230 that repeats for each window of indexes. In this manner, the inner loops operate only on the index values within the window. If the window is chosen at a correct size, then the cache will be able to hold the values of the appropriate window of the iteration space through all of the N_ITER outer iterations and thus may provide for good re-usage of cache data. However, it can be seen that the solution for the nested loops is of use in only limited cases. In this instance, the operations do not contain any feedforward or feedback indexes. If conventional blocking of data is attempted with feedforward or feedback indexes, then the windows of data possibly will not contain the data elements in the correct states required to perform the needed operations.

FIG. 3 is an illustration of certain loop types that may be addressed by embodiment of the invention. In an embodiment of the invention, loops that contain any constant offsets (backward, forward, or both) are handled by allowing for blocks that have a jagged shape in a two-dimensional iteration space for the loops. FIG. 3 provides four examples of simple cases of read or write accesses that have feedforward or feedback indexes. Loop type 1 305 is an illustration of a read forward loop, in which function F reads array B at a later point, indicated as an index of I+1. Loop type 2 310 is a write forward loop, in which array A at index I+1 is assigned a value determined at index I. Loop type 3 315 is a read backward loop operation, in which function F now reads array B at earlier index I−1. Loop type 4 320 is then a write backward example, with function A for index I−1 being assigned a value determined at index I. While these examples illustrate the simplest cases, other various combinations of feedforwards and feedbacks in an operation are also possible.

In one particular example, if a loop contains a function of an array A and a function of array B, with each being run from index 1 through N, then 2N words of data are needed. If the 2N words of A and B do not fit into the cache memory that is available, then in each outer iteration A and B data may have to be largely loaded from memory and stored as needed. In an embodiment of the invention, a strategy may provide for splitting the iteration space smaller windows WIN that disjointly cover the space, with WIN being small enough to fit A and B into the cache.

Figure 4A:
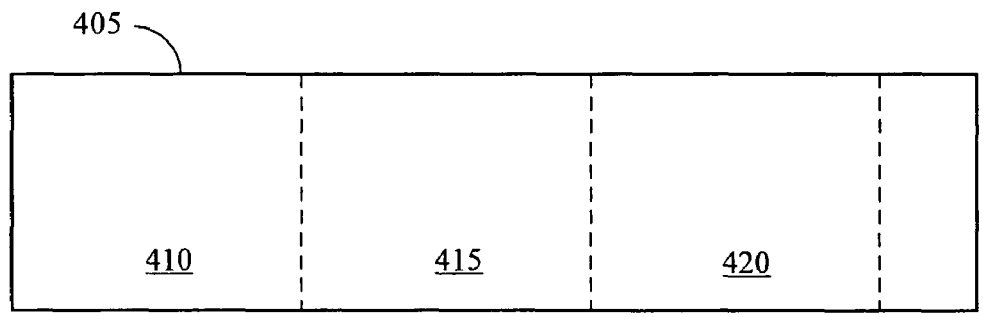
FIG. 4A is an illustration of windows used over an iteration for blocking a loop.
Figure 4B:
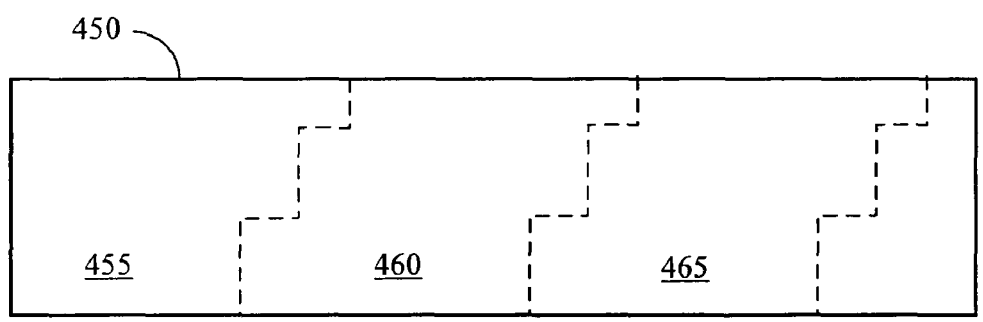
FIG. 4B is an illustration of windows used over an iteration space for blocking a loop that includes one or more feedback or feedforward indexes.

Under an embodiment of the invention, blocking is modified to include iteration space cases that imply blocking shapes such as those illustrated in FIGS. 4A and 4B. In an embodiment, a window over the inner and outer loops' iteration space may be shifted from iteration to iteration of the outer loop, with the size of the shift also eventually varying from loop to loop. In an illustration of the two-dimensional iteration space for the loops, it can be seen that the shape may have a constant size in one dimension, but arbitrary skewing in the second dimension. In an embodiment of the invention, a strategy to address each of the simple feedforward and feedback cases may be used to form a general strategy for a class of nested loops.

FIG. 4A is an illustration of shapes used for iterations for blocking a loop. In this illustration, it is assumed that the iterations do not include any feedback or feedforward indexes. For these circumstances, the rectangular shape 405 is sufficient to provide for all data in correct state all the time. To allow the cache to hold needed data, the iteration space 405 is divided into multiple shapes, shown here as a first shape 410, a second shape 415, and a third shape 420. Any number of shapes may be used, with the appropriate size of the shape being based on issues related to the amount of cache memory available and the amount of data used in the inner loop. In this illustration, the operations using the elements in first shape 410 will be addressed in a first iteration of an outermost loop that is added. When these calculations are completed, then the following iteration will address the elements in second shape 415, followed then by the elements found in third shape 420.

FIG. 4B is an illustration of windows used over an iteration space for blocking a loop that includes one or more feedback or feedforward indexes. In this illustration, the iteration space 450 is again composed of the indexes for use in calculations. However, the operations include one or more feedforwards or feedbacks. Because of this, the windows of FIG. 4A will not provide for the correct state of all data for all of the processing. In this case, certain shapes are used to reflect the feedforward or feedback operations provided in the nested loops, with the shape being shown as a first shape 455, a second shape 460, and a third shape 465. As seen in the illustration, the shapes in this example have "jagged" edges in one dimension. Below in FIGS. 5A-5D, there is further explanation regarding how specific feedbacks and feedforwards may imply particular shapes. Windows may be shifted or resized as needed to maintain correctness of data accesses.

FIGS. 5A through 5D are examples of shapes to be applied to the iteration space of certain types of loops in certain embodiments of the invention. While these figures only provide certain examples and other possibilities exist, the figures illustrate principles used in creating shapes for particular loop structures. In these figures, the window size is selected to be 4 for the purposes of illustration, but any size of window may be utilized. The figures use example arrays A and B and the loop types presented in FIG. 3. The entries in the 6×8 matrices shown symbolize the state of the arrays A and B. A row of a matrix represents the entries of an array, and a state indicates how many times the outer iteration has touched the respective entries, given the strategy using a block size of 4 elements. In the figures, the first entries in white background illustrate the states after a first skewed shape, with the gray entries being what will be contained in the second block shape. An added outer loop runs through the plurality of shapes. The critical points that require the non-rectangular shapes are shown in FIGS. 5A through 5D.

Figures 5A, 5B, 5C, 5D:
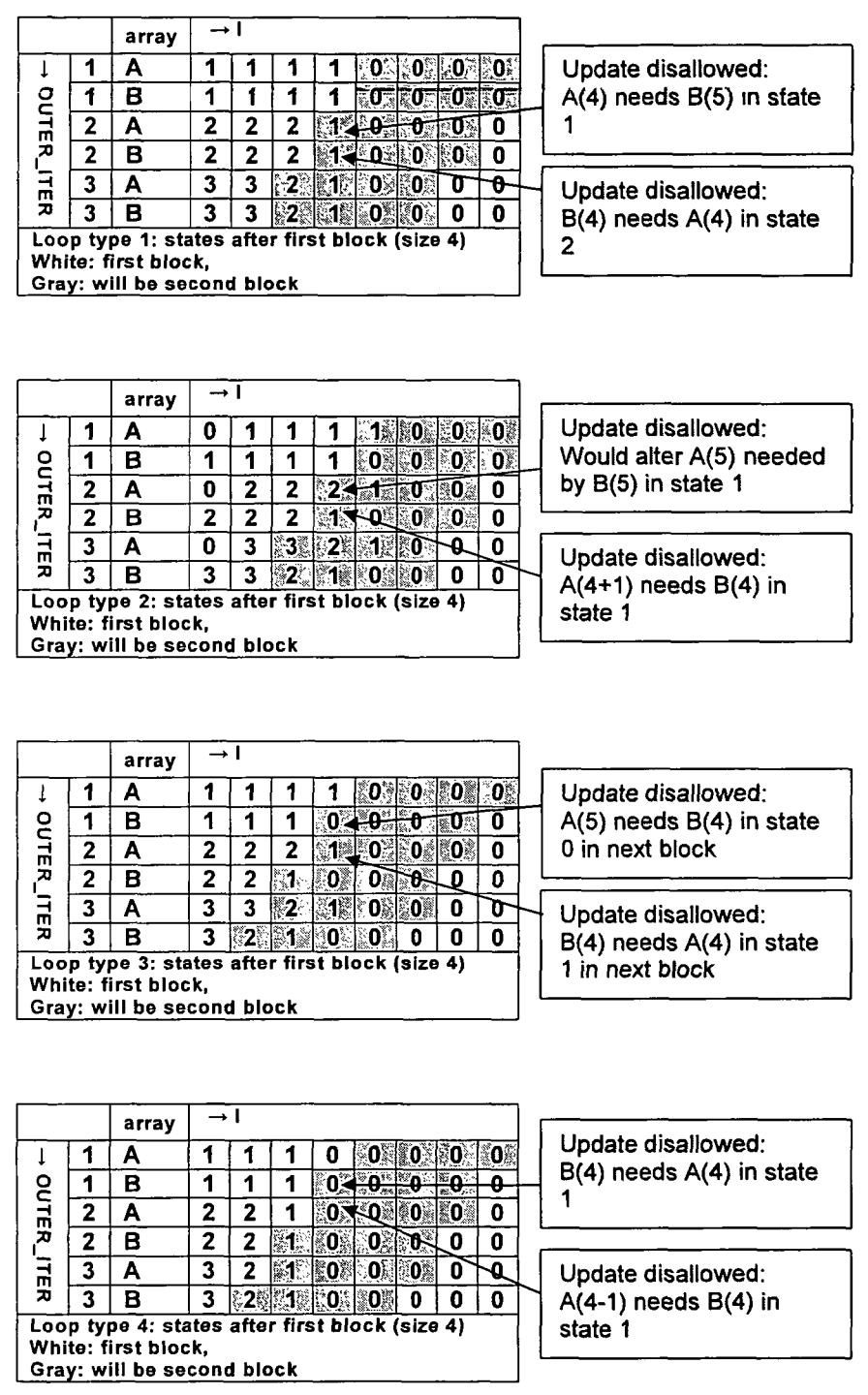

FIG. 5A is an illustration of a shape for a first loop type in an embodiment of the invention. The first loop type has a read forward, such as shown as loop type 1 305 of FIG. 3. As shown in the illustration, a rectangular shape of data will not work in this instance because of the read forward. With a block size of 4, a critical point where update would be disallowed occurs at A(4) as shown in state 1 because this requires the value of B(5) in the state 1, but which is still in state 0 as B(5) was not updated due to the window size of 4. In addition, B(4) as shown requires the value of A(4) in state 2 which is not given. The jagged shape shown divides the iteration space in a way that allows for all iterations of the outer loop, with a moving window for the inner loop, thus potentially allowing the cache to hold all data throughout all of the outer iteration.

FIG. 5B is an illustration of a shape for a second loop type in an embodiment of the invention. In this case, the second loop type has a write forward, such as shown as loop type 2 310 of FIG. 3. As shown in the illustration, a rectangular shape of data will not work in this instance because of the write forward. With a block size of 4, a critical point where update would be disallowed occurs at I=4 as shown, where A(S) would be altered to state 2 but which is however needed by B(S) in the state 1, for the next window in the next shape of outer iterations. In addition, at I=4 A(4+1) needs B(4) in state 1 in the next shape so B(4) cannot be updated as shown. The jagged shape shown in FIG. 5B divides the iteration space in a way that allows for all iterations of the outer loop, with a moving window for the inner loop, thus potentially allowing the cache to hold all data throughout all of the outer iteration.

FIG. 5C is an illustration of a shape for a third loop type in an embodiment of the invention. The third loop type has a read backward, such as shown as loop type 3 315 of FIG. 3. Again, a rectangular shape of data will not work in this instance. In this instance, a critical point where update would be disallowed occurs as shown because A(5) requires the value of B(4) in state 0 in the next shape. Further, B(4) requires the value of A(4) in state 1 in the next shape. The jagged shape shown in FIG. 5C, which differs from the shape for the FIG. 5A or FIG. 5B, divides the iteration space in a way that allows for all iterations of the outer loop, with a moving window for the inner loop, thus potentially allowing the cache to hold all data throughout all of the outer iteration.

FIG. 5D is an illustration of a shape for a fourth loop type in an embodiment of the invention. The fourth loop type has a write backward, such as shown as loop type 4 320 of FIG. 3. As shown in the illustration, a rectangular shape of data will not work in this instance because of the write backward. With a block size of 4, a critical point where update would be disallowed occurs at I=4 as shown, where B(4) needs A(4) in the state 1, which is not given due to the previous outer iteration only run until I=4. In addition, at I=4 A(4−1) needs B(4) in state 1 which is also not given. The jagged shape shown divides the iteration space in a way that allows for all iterations of the outer loop, with a moving window for the inner loop, thus potentially allowing the cache to hold all data throughout all of the outer iteration.

In an embodiment of the invention, a strategy for the blocking of loops containing feedforward or feedback elements may be implemented for a compiler or other code translation processor. In one embodiment, certain logical structures are put in place in order for the general strategy to work for a nested loop, with the loop types shown in FIG. 3 being simple examples of loop structures that may be blocked. These structures are described as follows:

(a) The nested loop includes an outer iteration that repeatedly runs a particular calculation block, designated herein as CALC.

(b) CALC consists of any number of second level loops, all with the same iteration space, which is independent of the outer loop's iteration space. (A generalization to more nesting levels of loops is also possible in other embodiments of the invention.)

(c) There may be any number of arrays with the same multidimensional index domains that are write accessed within CALC. Such arrays then would generally be read accessed as well. (If arrays are only read accessed and are not write accessed within CALC, this does not influence the strategy presented for loop blocking.)

(d) The index of the calculations of a loop or loops (I is used as the index herein) is used for indexing one and the same dimension of all involved arrays, and is used only in a straight or constant shift manner. This indicates that all assignments within the I-loops have the form:

$$\text{array}M_K(I+LWK)=F[\text{array}1\{I+LR1, \ldots, I+UR1\}, \ldots, \text{array}X\{I+LRX, \ldots, I+URX\}]$$

where:

$K=1, N\_ASS$ numbers all of the occurring loop assignments (in a number symbolized by N_ASS)

$M_K$ is one of the set $1, \ldots, X$ array1 ... array X are the involved write accessed arrays (with any indexes other than I not shown)

LWK, LRK, and URK are integer offsets that may vary between the different assignments of CALC, but are constant with respect to the outer iteration of the loop The set denotation arrayK{I+LRK, ..., I+URK} means that some or all entries of arrayK in this index window are read accessed In one possible example of a more complex nested loop structure, a key loop in a particular benchmark is a polynomial preconditioner for an iteration of the well known conjugate gradient (cg) algorithm, which is as follows:

DO K=IDP, 1, −1 ! IDP is the polynomial degree $$DO\ I=1,N:V(I)=W(I)+C(IDP)*R(I)$$

$$DO\ I=1,N:W(I)=((((V(I)+CB(I)*V(I-MBA))+CG(I)*V(I-1)+CG(I+1)*V(I+1))+CB(I+MBA)*V(I+MBA))$$

ENDDO

In an embodiment of the invention, conditions provided above are fulfilled with the 2 arrays V and W and also N_ASS=2 assignments. (The other arrays in this process are only read and thus can be ignored for purposes of this action.) In this example, array1=V, array2=W, all LW1=0; all LW2=0. In the first loop, all LR1, UR1, LR2, and UR2=0. In the second loop, LR1=−MBA, UR1=MBA, and LR2=UR2=0.

Under an embodiment of the invention, a strategy may be applied to any relevant nested loop combining the concepts presented in FIGS. 5A through 5D. However, the formulation of this solution is generally complicated and will be difficult to implement in many cases. Under an embodiment of the invention, a simplification yields an acceptable solution that is not optimal, but provides an easy waveforming-like strategy that uses a constant shift S of the window between any two of the I-loops that is based at least in part on the I-loops. This constant shift provides what is needed for an embodiment of the invention to work and may be implemented automatically, such as by a compiler or other code interpretation process.

Figure 6:
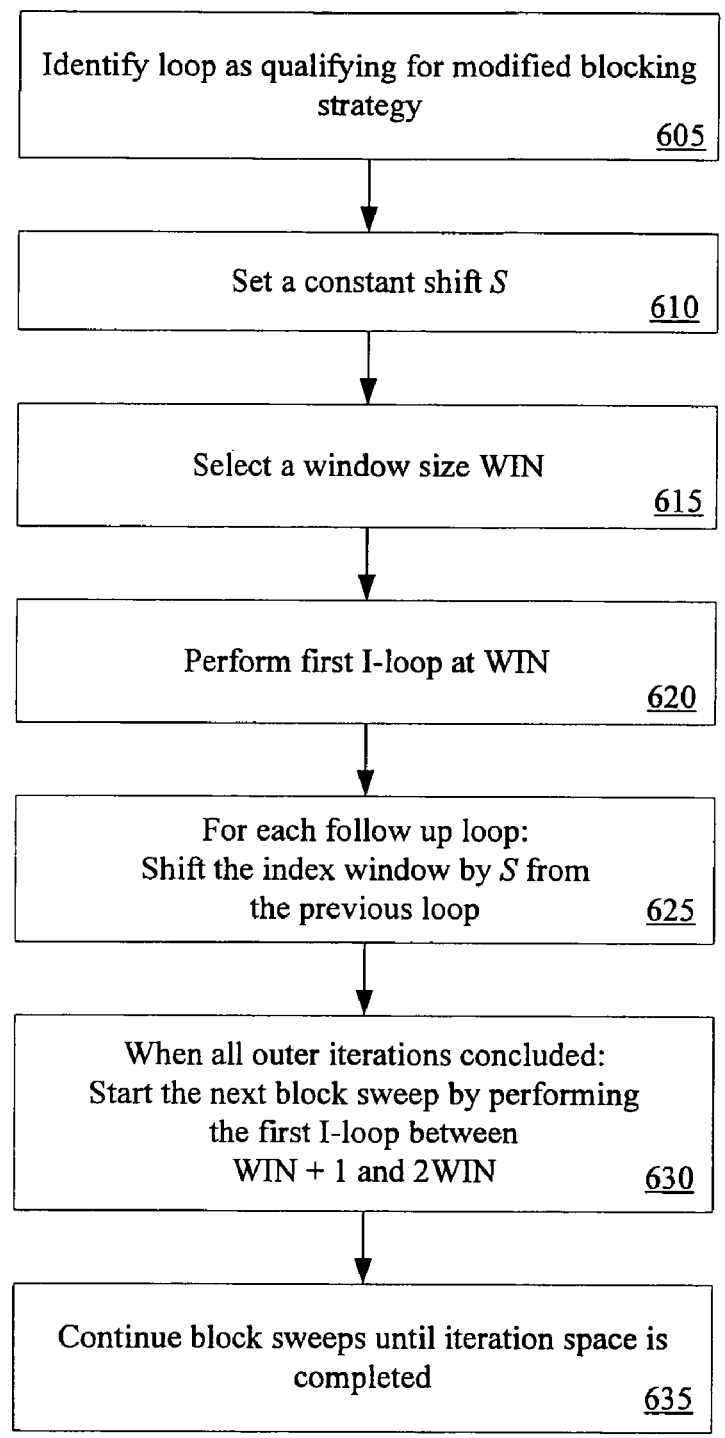
FIG. 6 is flowchart of blocking processes in an embodiment of the invention.

FIG. 6 is flowchart of blocking processes in an embodiment of the invention. A loop may be identified as qualifying for the modified blocking strategy under an embodiment of the invention 605. A constant shift S is established 610 (which is further developed below in FIG. 7). A window size WIN is set 615, with the size being based on, among other elements, the amount of cache space that is available. The first inner loop is the performed at the WIN 620. For each follow up inner loop, and also when entering another outer iteration, the index window then is shifted by S as compared to the previous I-loop 625. When all of the outer iterations are completed, then another block sweep is begun, which is commenced at the first inner loop between WIN+1 and 2WIN 630. The block sweeps then are continued until the iteration space is completely covered 635.

Figure 7:
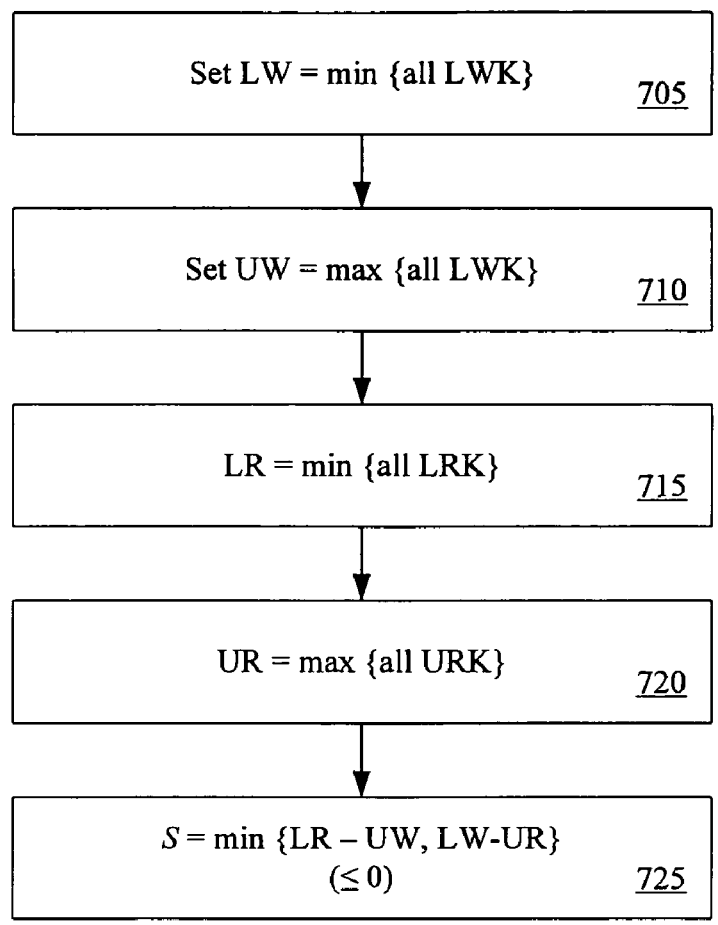
FIG. 7 is a flowchart to illustrate establishment of a shift value for loop blocking in an embodiment of the invention.

FIG. 7 is a flowchart to illustrate establishment of a shift value for loop blocking in an embodiment of the invention, such as used in the process illustrated in FIG. 6. The constant shift, while not necessarily providing optimal windows, will provide a workable solution for loop blocking. Using the format for an I-loop that may be optimized under an embodiment of the invention:

$$\text{array}M_K(I+LWK)=F[\text{array}1\{I+LR1, \ldots, I+UR1\}, \ldots, \text{array}X\{I+LRX, \ldots, I+URX\}]$$
$$(K=1,N\_ASS)$$

Certain variables are computed based on the index shifting from such a system of I-loops. LW (lower write) is the minimum of all LWK shifts 705. UW (upper write) is the maximum of all LWK shifts 710. LR is the minimum of all LRK (lower read) shifts 715 and UR is the maximum of all URK (upper read) shifts 720. Using such shifts, if it is assumed that a previous I-loop has been performed until point $M^-$, and the current loop is to go on until M, then it is safe to have no update in the current loop above $M^-+LR$, such as in the loop type 3 case shown in FIG. 5C. For this reason, $M+UW \leq M^-+LR$, or $M \leq M^-+LR-UW$. The arrays are guaranteed to be in the correct state until $M^-+LW$. All read accesses I+URK must only touch up-to-date states (such as shown for loop type 1 in FIG. 5A), and thus $M+UR \leq M^-+LW$, or $M \leq M^-+LW-UR$. It then can be seen that overall $M \leq M^-+\min(LR-UW, LW-UR)$ is a sufficient choice, and thus one can set $S=\min(LR-UW, LW-UR)$ 725. This S is always non-positive, so the shift will always be leftward.

In the description above, for the purposes of explanation, numerous specific details are set forth in order to provide a thorough understanding of embodiments of the invention. It will be apparent, however, to one skilled in the art that embodiments of the invention may be practiced without some of these specific details. In other instances, well-known structures and devices are shown in block diagram form.

Embodiments of the invention may include various processes. The processes may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of embodiments of the invention may be provided as a computer program product, which may include a machine-readable medium having stored thereon instructions, which may be used to program a computer (or other electronic devices) to perform a process according to an embodiment of the invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, or flash memory. Moreover, embodiments of the invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of embodiments of the invention. It will be apparent to those skilled in the art that many further modifications and adaptations can be made. The particular embodiments are not provided to limit the invention but to illustrate it. The scope of an embodiment of the invention is not to be determined by the specific examples provided above but only by the claims below.

It should also be appreciated that reference throughout this specification to "one embodiment" or "an embodiment" means that a particular feature may be included in the practice of an embodiment of the invention. Similarly, it should be appreciated that in the foregoing description of exemplary embodiments of the invention, various features of embodiments of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiments of the invention require more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A computer implemented method comprising:
   receiving a computer code segment and storing the computer code segment in a random access memory, the segment including a first inner loop and a second outer loop, the first loop being within the second loop and having an one-dimensional iteration space that is independent of the outer loop, the first loop further being indexed by a variable I over the one-dimensional iteration space, the first loop addressing one or more data arrays with a shift in the index I; and
   automatically transforming the computer code segment using a processor to block nested loops of the segment by:
   dividing a two-dimensional iteration space for the first loop and the second loop into a plurality of contiguous windows, the second loop using only one window of the plurality of windows during each iteration of the second loop, the plurality of windows covering the two-dimensional iteration space, and
   modifying the computer code segment by adding a third outer loop outside the second loop of the segment, the third loop encompassing the first loop and the second loop, the third outer loop providing for iteration over all of the plurality of windows,
   wherein each window of the plurality of windows is shifted during the second loop to maintain correctness of data accesses, each window of the plurality of windows using a constant shift throughout the second loop, the wherein a constant shift value S is computed based at least in part on an indexing scheme used for the first loop; and
   wherein the constant shift value S is calculated as:

$$S = \min(LR - UW, LW - UR)$$

where:
   each of the inner loops reads or writes a set of arrays array1, array2, . . . and the K-th assignment within this system is of the form arrayM$_K$(I+LWK)=F [array1{I+LR1, . . . , I+UR1}, . . . , arrayX{I+LRX, . . . , I+URX}]
   LW is the minimum of all LWK write shifts, UW is the maximum of all LWK write shifts, LR is the minimum of all LRK read shifts, and UR is the maximum of all URK read shifts.

2. The computer implemented method of claim 1, wherein the first loop comprises a forward shift I+Sf.

3. The computer implemented method of claim 1, wherein the first loop comprises a reverse shift I−Sb.

4. The computer implemented method of claim 1, wherein the computer code segment includes one or more additional inner loops at the same loop level and with the same iteration space as the first loop.

5. The computer implemented method of claim 1, wherein each window yields a skewed shape in the two-dimensional iteration space for the first and second loops.

6. The computer implemented method of claim 5, wherein a shape of the window includes an uneven edge in one dimension of the iteration space.

7. A system comprising:
   a random access memory to hold a computer program, wherein the computer program includes a nested loop, the nested system having a first program loop and a second program loop, the first program loop being within the second program loop, the first program loop being indexed over a contiguous one-dimensional iteration space, the first program loop having a constant index shift;
   a cache memory to hold values from a memory, the values including values for a two-dimensional iteration space for the nested loop; and
   a processing unit to evaluate the computer program and to generate a modified form of the nested loop, the modified form including an outer loop around the nested loop and generating a plurality of blocks over the two-dimensional iteration space for the nested loop, the system generating the modified form of the nested loop automatically based at least in part on the form of the nested loop, wherein the blocks consists of a sequence of windows that are shifted in reference with each other throughout the iteration of the second program loop as needed to keep data in the correct state for processing, wherein each block uses a constant shift value between any two of windows, the constant shift value based at least in part on an indexing scheme used for the first program loop;
   wherein the constant shift value is calculated as:

$$S = \min(LR - UW, LW - UR)$$

where:
   each of the inner loops reads or writes a set of arrays array1, array2, . . . and the K-th assignment within this system is of the form arrayM$_K$(I+LWK)=F[array1{I+LR1, ..., I+UR1}, ..., arrayX{I+LRX, ..., I+URX}] LW is the minimum of all LWK write shifts, UW is the maximum of all LWK write shifts, LR is the minimum of all LRK read shifts, and UR is the maximum of all URK read shifts.

8. The system of claim 7, wherein one or more of the blocks are skew shaped.

9. The system of claim 7, wherein each block handled by the outermost iteration fits within the cache memory.

10. The system of claim 7, wherein the system generates the modified form of the nested loop automatically based at least in part on the form of the nested loop.

11. A machine-readable medium having stored thereon data representing sequences of instructions that, when executed by a processor, cause the processor to perform operations comprising:
  receiving a computer program for compiling, the computer program including an outer loop and a plurality of inner loops, the inner loops being within the outer loop, the inner loops being indexed over a contiguous one-dimensional iteration space, an inner loop of the plurality of inner loops having an index that is shifted;
  compiling the computer program, the compilation of the computer program including:
    adding an additional loop around the outer loop, and
    dividing the values of a two-dimensional iteration space for the outer loop and inner loops into a plurality of shapes, the added loop running iterations of the values for each shape in sequence, wherein each shape of the plurality of shapes comprises a sequence of windows over the inner loops iteration space that are shifted in reference to each other throughout the iteration of the outer loop, the shift value being a constant that is based at least in part on the indexing of the inner loops;
  wherein the constant shift value is calculated as:

$S=\min(LR-UW, LW-UR)$ where:
  each of the inner loops reads or writes a set of arrays array1, array2, ... and the K-th assignment within this system is of the form arrayM$_K$(I+LWK)=F[array1{I+LR1, ..., I+UR1}, ..., arrayX{I+LRX, ..., I+URX}] LW is the minimum of all LWK write shifts, UW is the maximum of all LWK write shifts, LR is the minimum of all LRK read shifts, and UR is the maximum of all URK read shifts.

12. The medium of claim 11, wherein each of the plurality of shapes is formed so that all processed data are kept in the proper state for iterations that have updated them.

13. A computer implemented method comprising:
  receiving a computer code segment and storing the computer code segment in a random access memory, the segment including a first inner loop and a second outer loop, the first loop being within the second loop and having an one-dimensional iteration space that is independent of the outer loop, the first loop further being indexed by a variable I over the one-dimensional iteration space, the first loop addressing one or more data arrays with a shift in the index I; and
  automatically transforming the computer code segment using a processor to block nested loops of the segment by:
    dividing a two-dimensional iteration space for the first loop and the second loop into a plurality of contiguous windows, the second loop using only one window of the plurality of windows during each iteration, the plurality of windows covering the two-dimensional iteration space, and
    modifying the computer code segment by adding a third outer loop outside the second loop of the segment, the third loop encompassing the first loop and the second loop;
  wherein a first window of the plurality of windows used by the second loop is shifted or resized during the second loop to maintain correctness of data accesses, the first window yielding a skewed shape in the two-dimensional iteration space for the first and second loops, the shape of the first window including an uneven edge in one dimension of the iteration space, each window of the plurality of windows using a constant shift of its window throughout the second loop, and wherein the constant shift value S is calculated as:

$S=\min(LR-UW, LW-UR)$ where:
  each of the inner loops reads or writes a set of arrays array1, array2, ... and the K-th assignment within this system is of the form arrayM$_K$(I+LWK)=F[array1{I+LR1, ..., I+UR1}, ..., arrayX{I+LRX, ..., I+URX}] LW is the minimum of all LWK write shifts, UW is the maximum of all LWK write shifts, LR is the minimum of all LRK read shifts, and UR is the maximum of all URK read shifts.

* * * * *